(12) United States Patent
Mezer et al.

(10) Patent No.: US 8,379,710 B2
(45) Date of Patent: Feb. 19, 2013

(54) TRANSMITTER CONTROL IN COMMUNICATION SYSTEMS

(75) Inventors: Amir Mezer, Haifa (IL); Adee Ran, Maayan Baruch (IL)

(73) Assignee: Intel Corporation, Santa Clara, CA (US)

( * ) Notice: Subject to any disclaimer, the term of this patent is extended or adjusted under 35 U.S.C. 154(b) by 479 days.

(21) Appl. No.: 12/381,282

(22) Filed: Mar. 10, 2009

(65) Prior Publication Data

US 2010/0232492 A1 Sep. 16, 2010

(51) Int. Cl.
*H03H 7/30* (2006.01)

(52) U.S. Cl. ........ 375/232; 375/229; 375/230; 375/231; 375/257

(58) Field of Classification Search .......... 375/232, 375/257, 229, 230, 231; 708/300, 819; 333/18
See application file for complete search history.

(56) References Cited

U.S. PATENT DOCUMENTS

| | | | |
|---|---|---|---|
| 4,860,283 A | 8/1989 | Takano et al. |
| 5,491,565 A | 2/1996 | Naper |
| 5,627,836 A | 5/1997 | Conoscenti et al. |
| 5,805,597 A | 9/1998 | Edem |
| 5,889,776 A | 3/1999 | Liang |
| 5,907,553 A | 5/1999 | Kelly et al. |
| 5,930,015 A | 7/1999 | Yamamoto et al. |
| 6,169,729 B1 | 1/2001 | Feuerstraeter |
| 6,198,727 B1 | 3/2001 | Wakeley et al. |
| 6,201,654 B1 | 3/2001 | Okamoto et al. |
| 6,215,184 B1 | 4/2001 | Stearns et al. |
| 6,215,816 B1 | 4/2001 | Gillespie et al. |
| 6,222,852 B1 | 4/2001 | Gandy |
| 6,345,345 B1 | 2/2002 | Yu et al. |
| 6,349,331 B1 | 2/2002 | Andra et al. |
| 6,359,893 B1 | 3/2002 | Mills |
| 7,284,184 B2 | 10/2007 | Gallezot et al. |
| 7,343,540 B2 | 3/2008 | Khermosh et al. |
| 7,499,500 B2 | 3/2009 | Page |
| 7,835,389 B2 * | 11/2010 | Yu et al. ................. 370/465 |
| 2001/0009533 A1 | 7/2001 | Baroche |
| 2001/0009553 A1 | 7/2001 | Homann |
| 2001/0034729 A1 | 10/2001 | Azadet et al. |
| 2002/0091884 A1 | 7/2002 | Chang et al. |
| 2002/0123365 A1 | 9/2002 | Thorson et al. |
| 2004/0001579 A1 | 1/2004 | Feinberg et al. |
| 2004/0091027 A1 | 5/2004 | Booth et al. |

(Continued)

FOREIGN PATENT DOCUMENTS

| | | |
|---|---|---|
| JP | 10-304004 A | 11/1998 |
| JP | 2003-087261 A | 3/2003 |

(Continued)

OTHER PUBLICATIONS

Office Action received for U.S. Appl. No. 10/291,017, mailed May 9, 2006, 23 pages.

(Continued)

*Primary Examiner* — Dhaval Patel
(74) *Attorney, Agent, or Firm* — Glen B Choi

(57) ABSTRACT

Techniques are described to adaptively adjust the equalizer settings of each transmitter in a transmitter-receiver pair. The transmitter-receiver pair can be used at least with implementations that comply with 40GBASE-CR4 or 100GBASE-CR10. For implementations that comply with 40GBASE-CR4, equalizer settings of four transmitters may be independently established.

15 Claims, 2 Drawing Sheets

U.S. PATENT DOCUMENTS

| | | | |
|---|---|---|---|
| 2004/0233981 A1* | 11/2004 | Porter et al. | 375/229 |
| 2004/0247313 A1 | 12/2004 | Tanaka | |
| 2005/0111531 A1 | 5/2005 | Booth et al. | |
| 2005/0149822 A1 | 7/2005 | Lee et al. | |
| 2006/0098686 A1 | 5/2006 | Takakuwa et al. | |
| 2007/0157060 A1 | 7/2007 | Ganga et al. | |
| 2008/0244100 A1 | 10/2008 | Uddenberg et al. | |
| 2009/0219978 A1* | 9/2009 | Mobin et al. | 375/219 |

FOREIGN PATENT DOCUMENTS

| | | |
|---|---|---|
| JP | 2003-87276 A | 3/2003 |
| TW | I236237 | 7/2005 |
| WO | 2001047184 A2 | 6/2001 |
| WO | 200404518 A1 | 1/2004 |
| WO | 2005091569 A1 | 9/2005 |

OTHER PUBLICATIONS

Office Action received for U.S. Appl. No. 10/291,017, mailed Aug. 4, 2008, 22 pages.

Office Action received for U.S. Appl. No. 10/291,017, mailed Nov. 1, 2006, 19 pages.

Office Action received for U.S. Appl. No. 10/291,017, mailed Feb. 3, 2009, 25 pages.

Office Action received for U.S. Appl. No. 10/801,504, mailed May 29, 2007, 24 pages.

Office Action received for U.S. Appl. No. 10/801,504, mailed Mar. 31, 2008, 19 pages.

Office Action received for U.S. Appl. No. 10/801,504, mailed Dec. 11, 2007, 18 pages.

Office Action received for U.S. Appl. No. 10/801,504, mailed Dec. 9, 2008, 25 pages.

Richard Mellitz, "40 GbE Over 4-lane 802.3ap Compliant Backplane", IEEE 802.3 HSSG, Nov. 2007, 11 pages.

Richard Mellitz, "IEEE 802.3ap (or 10GBASE-KR) Jitter Spec is Inclusive Of Package Crosstalk and is Sufficient for IEEE 802.3ba Systems", IEEE 802.3ba Interim, Jan. 2008, 8 pages.

Ilango Ganga, "40/100G Architecture & Interfaces proposal", IEEE 802.3ba Interim meeting, Portland, OR, Jan. 23, 2008, 9 pages.

Chris Cole, "Nx10G Electrical I/O Issues", IEEE 802.3 Higher Speed Study Group, Finisar, Nov. 12-15, 2007, 13 pages.

"Part 3: Carrier Sense Multiple Access with Collision Detection (CSMA/CD) Access Method and Physical Layer Specifications", Draft Amendment to IEEE Std 802.3-2008 IEEE 802.3ba 40Gb/s and 100Gb/s Ethernet Task Force, Draft Standard for Information technology—Telecommunications and information exchange between systems—Local and metropolitan area networks—Specific requirements, IEEE P802.3ba™/D1.1, Dec. 9, 2008, 366 pages.

"Part 3: Carrier Sense Multiple Access with Collision Detection (CSMA/CD) Access Method and Physical Layer Specifications", Amendment 4: Ethernet Operation over Electrical Backplanes, IEEE Standard for Information technology—Telecommunications and information exchange between systems—Local and metropolitan area networks—Specific requirements, IEEE Std 802 3ap™, May 22, 2007, 203 pages.

Office Action Received for Japanese Patent Application No. 2007-504035, mailed on May 12, 2009, 4 pages, including 2 pages of English translation.

International Preliminary Report on Patentability for PCT Patent Application No. PCT/US 2003/034160, mailed on Jul. 27, 2010, 8 pages.

International Preliminary Report on Patentability issued in PCT Patent Application No. PCT/US2005/008607, mailed on Sep. 28, 2006, 9 pages.

Chinese Office Action received for Chinese Patent Application No. 200580005349.3, maied on Mar. 14, 2008, 30 Pages, including 18 pages of English translation.

International Search Report and Written Opinion issued in PCT Patent Application No. PCT/US2005/008607, Jun. 10, 2010, 14 Pages.

Baek et al., "Increased Radiation Emission and Impedance Change by Edge Placement of High-Speed Differential Lines on Printed Circuit Board", IEEE International Symposium on Electromagnetic Compatibility, Aug. 19, 2002, pp. 200-204.

Lund et al., "Going Serial in Gigabit Ethernet Designs". Broadcom Corp., Comms Design. Com dated Jun. 20, 2002. Retrived from the http://www.commsdesign.com/story/OEG2002,0620S0004, 5 pages.

Office Action Received for Taiwanese Patent Application No. 092131067, mailed Dec. 17, 2004, 3 pages, including 1 page of English translation.

Office Action for European Patent Application No. 03779361.9, mailed Nov. 6, 2007, 9 pages.

Notice of Allowance Received for Taiwan Patent Application No. 09231067, mailed May 9, 2005, 5 pages, including 3 pages of English translation.

Office Action Received for U.S. Appl. No. 12/381,205, mailed on Feb. 24, 2012, 8 pages.

NN9207223, "High Speed Bus", IBM Technical Disclosure Bulletin, vol. 35, Issue 2, Jul. 1992, pp. 223-224.

Ganga, Ilango' "Considerations for 40G Backplane Ethernet PHY", Intel, IEEE 802.3 Higher Speed Study Group, Sep. 12, 2007, pp. 1-11.

Szczepanek et al., "10GBASE-KR FEC Tutorial", IEEE 802 Plenary Jul. 2006, pp. 1-87.

Hankins, Greg, " IEEE P802.3ba 40 GbE and 100 GbE Standards Update", NANOG 44, Oct. 13, 2008, pp. 1-24.

"IEEE Draft P802.3ap/Draft 3.0", Jul. 25, 2006, pp. 162-183.

Office Action received U.S. Appl. No. 12/381,194, 13 pages.

Notice of Allowance and Reasons for Allowance received in U.S. Appl. No. 12/381,205, mailed Jul. 11, 2012, 14 pages.

* cited by examiner

US 8,379,710 B2

TRANSMITTER CONTROL IN COMMUNICATION SYSTEMS

RELATED APPLICATIONS

This application is a continuation-in-part of U.S. patent applications having Ser. Nos. 12/381,205, and 12/381,194 respectively entitled "Interconnection Techniques" and "Cable Interconnection Techniques," both filed Mar. 9, 2009, inventors Ganga and Mellitz and incorporates by reference the contents of those applications in their entirety.

FIELD

The subject matter disclosed herein relates generally to techniques to transmit signals.

RELATED ART

The Institute of Electrical and Electronics Engineers, Inc. (IEEE) has defined numerous networking standards. For example, 10 GBASE-CX4 defines signal transmission at 10 Gbps using four lanes over copper cabling. Similarly, 10 GBASE-KX4 defines signal transmission at 10 Gbps using four lanes over backplane whereas 10 GBASE-KR defines signal transmission at 10 Gbps over a single lane over backplane.

The evolving IEEE 802.3ba draft 1.1 (2008) standard defines 40 Gbps operation over copper cable. This evolving standard is also known as 40GBASE-CR4. Copper coaxial cables are characterized by frequency dependent loss and exhibit loss strongly dependent on channel length. Various vendors have proposed manners to transmit at 40 Gbps over copper cable. For example, one implementation involves use of fixed transmit equalization in compliance with small form-factor pluggable (SFP+) as described in IEEE Std. 802.3ae-2002 and IEEE Std. 802.3aq-2006. In this implementation, the transmitter circuit is coupled to a hot pluggable optical cable using a fixed length printed circuit board trace. Fixed transmit equalization involves establishing a desired eye opening at a transmitter side. An eye diagram represents transitions of a signal. The more open an eye diagram, the less likelihood the signal will be misread. However, because copper cable length varies, this scheme leads to varying voltage levels and eye patterns at the receiver. Different eye openings at the receiver can lead to errors in reading received data.

Another approach to reproducing received signals includes use of an analog filter at the receiver (e.g., a continuous-time linear equalizer (CTLE)). However, this approach provides suboptimal eye opening characteristics at the receiver. Yet another approach involves use of an analog-to-digital converter (A/D) and digital signal processor at the receiver. However, this approach uses high power and is complicated to implement.

It is desirable to develop techniques to provide acceptable received signal performance over copper cable at speeds over 10 Gbps such as at 40 Gbps.

BRIEF DESCRIPTION OF THE DRAWINGS

Embodiments of the present invention are illustrated by way of example, and not by way of limitation, in the drawings and in which like reference numerals refer to similar elements.

DETAILED DESCRIPTION

Reference throughout this specification to "one embodiment" or "an embodiment" means that a particular feature, structure, or characteristic described in connection with the embodiment is included in at least one embodiment of the present invention. Thus, the appearances of the phrase "in one embodiment" or "an embodiment" in various places throughout this specification are not necessarily all referring to the same embodiment. Furthermore, the particular features, structures, or characteristics may be combined in one or more embodiments.

Various authors have expressed that use of multiple cables to increase the rate of data transmission may incur cross talk among signals on the cables and lead to unacceptable performance. For example, slide 10 of Cole, "Nx10G Electrical I/O Issues," IEEE 802.3 Higher Speed Study Group (November 2007) indicates that cross talk from adjacent conductors, traces, and connectors may lead to unacceptable performance. However, embodiments described herein may exhibit acceptable bit error rates when IEEE 802.3ap (2007) is applied across multiple adjacent conductors.

Figure 1:
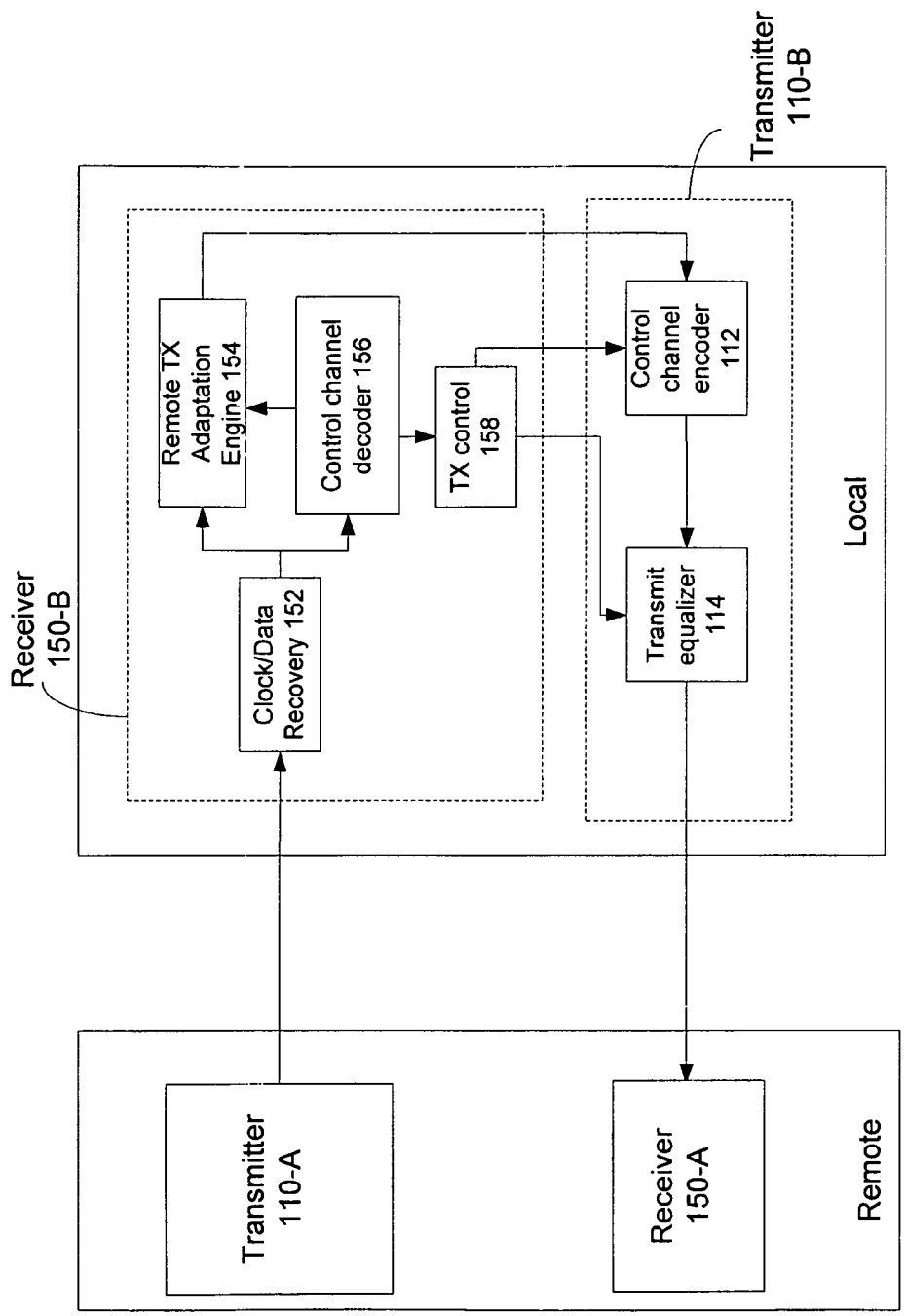
FIG. 1 depicts a system, in accordance with an embodiment.

FIG. 1 depicts a system, in accordance with an embodiment. System 100 includes transmitters 110-A and 110-B and respective complementary receivers 150-A and 150-B. Transmitter 110-A and receiver 150-A are part of the same remote device whereas transmitter 110-B and receiver 150-B are part of the same local device. A receiver may request to adjust equalizer settings of each transmitter from which the receiver receives signals. For example, receiver 150-A may request to adjust equalizer settings of transmitter 110-B. Transmitter 110-A and receiver 150-A operate in a similar manner as that of transmitter 110-B and receiver 150-B.

For 40 Gbps operation, the transmitter-receiver pairs can be replicated four times for receipt of signals on four lanes. For 100 Gbps operation, the transmitter-receiver pairs can be replicated ten times for receipt of signals on ten lanes. Signals from transmitter-receiver pair channel can be transmitted independently so that each lane operates independently. The number of pairs can be increased to achieve any higher multiple of the basic signaling rate. Also, the basic signaling rate may be higher or lower than that specified by 10 GBASE-KR.

Electrical transmit and receive specifications of transmitter-receiver pairs may be based on clause 72.7.1 of IEEE Std 802.3ap-2007. Combining signals from multiple lanes can be accomplished at a logic level as defined in IEEE 802.3ba draft 1.1 (2008).

Receiver 150-B includes clock and data recovery logic 152, remote transmit (TX) adaptation engine 154, control channel decoder 156, and transmit control 158. Clock and data recovery logic 152 may recover a clock from a signal received from transmitter 110-A and manipulate the data (e.g., through filtering or adaptive or fixed equalization) to recover the data which was transmitted by transmitter 110-A. Clock and data recovery logic 152 may reproduce a data signal from a signal received from transmitter 110-A and generate an error signal.

Control channel decoder 156 is a decoder which deciphers the answers (e.g., UPDATED, NOT UPDATED, MIN, OR MAX) received from remote transmitter 110-A generated in response to requests from transmitter 110-B to adjust equalizer settings of remote transmitter 110-A. Table 72-5, FIG. 72-6, and clauses 72.6.10.2.4, 72.6.10.2.5, 72.7.1.11 in IEEE Std 802.3ap provide examples of some answers from remote transmitter 110-A. Control channel decoder 156 transfers the answers to remote TX adaptation engine 154.

Control channel decoder 156 may also decipher the requests from a remote device to change the settings of transmitter equalizer 114 of transmitter 110-B (e.g., increment a tap gain). Control channel decoder 156 may pass the requests to TX control block 158. TX control block 158 may produce answers to requests from a remote device. TX control block 158 may insert the answers into the control channel for transmission to the remote device by transferring requests to control channel encoder 112.

Control channel encoder 112 inserts requests and answers into the control channel, in order to send them to the remote partner. Control channel decoder 156 may try to change the settings of transmit equalizer 114 per requests from a remote device, if possible.

Figure 2:
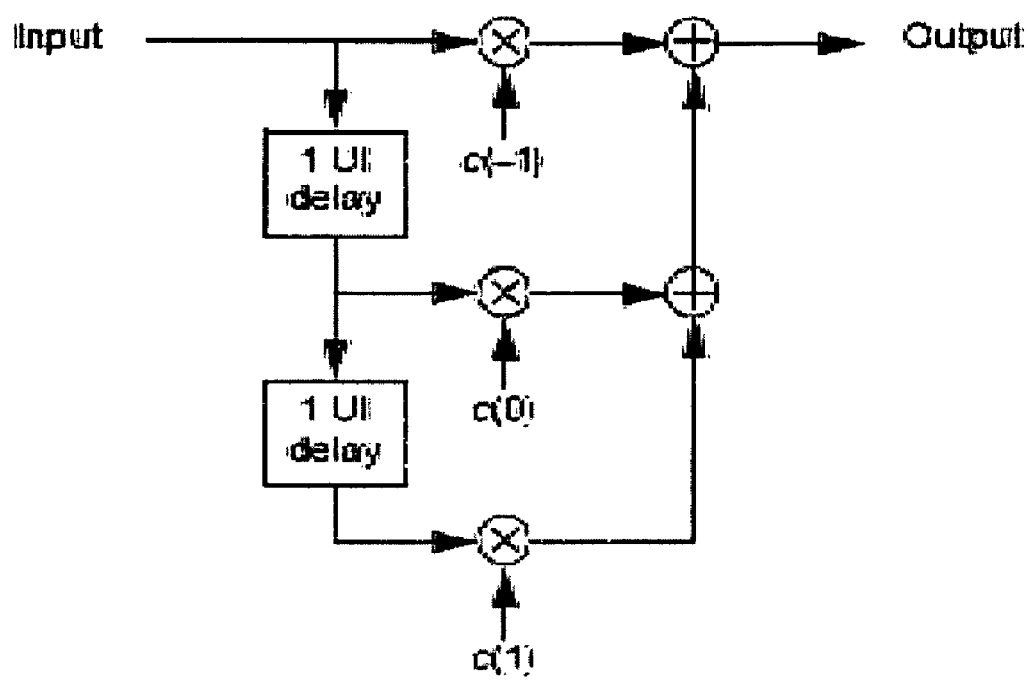
FIG. 2 depicts an example of a transmitter equalizer defined by FIG. 72-11 of IEEE Std 802.3ap-2007.

Transmit equalizer 114 may include a 3-tap transmit FIR driving the analog front-end, as described in 802.3ap (2007). For example, an embodiment of transmit equalizer is depicted in FIG. 2.

Some implementations of transmit equalizers may have a bank of N predefined (or arbitrary) transmit equalizers of any form (e.g., Continuous-Time Linear Equalizers (CTLE), finite impulse response filter, and Digital Infinite Impulse Response (IIR) filter), and apply a protocol which scans, while handshaking, between all the equalizer settings, and chooses the best equalizer in the remote transmitter for the receiver.

Referring again to receiver 150-B, remote transmit (TX) adaptation engine 154 may determine how to adapt the equalizer of remote transmitter 110-A based in part on the error signal and the received data from clock and data recovery 152 and an answer from control channel decoder 156. Remote TX adaptation engine 154 passes the adaptation requirements to control channel encoder 112 of transmitter 110-B. Control channel encoder 112 inserts these requests into the control channel to send them to receiver 150-A for transfer to transmitter 110-A.

In one embodiment, a receiver 150-A adjusts the equalization applied by a complementary transmitter 110-A using a control channel described with regard to the 10 GBASE-KR PMD control function as defined in clause 72.6.10 of IEEE Std 802.3ap-2007. Of note, 10 GBASE-KR is defined in IEEE Std 802.3ap-2007 for backplane but not cable. Establishing equalizer settings may take place after auto-negotiation (described later) successfully completes in order for the receiver to know the number of transmit-receive pairs.

In some embodiments, twin axial cables can be used as a medium between complementary transmitter and receiver pair. A twin axial cable may include two coaxial cables, with one coaxial cable for transmit direction and another coaxial cable for receive direction. For 40 Gbps signal transmission, eight coaxial cables are used, namely four for the transmit direction and four for the receive direction. However, other types of cable types may be used provided the specifications of clauses 85.10 and 85.11 of IEEE 802.3ba draft 1.1 (2008) are met. Cables with metal conductors other than copper can be used (e.g., any alloy such as but not limited to silver or platinum). Optical single and multimode cables can be used. Optical cables can be used in active cable assemblies. Active means there are electrical to optical converters in the cable assembly at each end. An equalization setting may be applied for each length of cable between complementary transmitter and receiver pairs.

Various embodiments of system are capable of transmitting signals at least at 40 Gbps in compliance with 40 GBASE-CR4.

FIG. 2 depicts an example of a transmitter equalizer defined by FIG. 72-11 of IEEE Std 802.3ap-2007. The feed forward equalizer (FFE) structure is described at clauses 72.7.1.10 and 72.7.1.11 of IEEE Std 802.3ap-2007. In this example, UI represents a clock cycle, C(1) represents a gain applied to a bit two clock cycles ago, C(0) represents a gain of a bit one clock cycle ago, and C(−1) represents a gain of the current bit. An output from the transmitter equalizer is a sum of weighted bits. For example, receiver 150-B may control the gains C(−1), C(0), and C(1). For example, remote transmit adaptation engine 154 (FIG. 1) may request to adjust the gains of the transmitter equalizer.

Standard IEEE 802.3aq defines how to perform equalization at receiver to combat inter-symbol interference at receiver. Equalizer settings at linear optical modules of a transmitter may be adjusted to adjust an eye at the receiver side using techniques described herein.

Adaptive transmit equalization enables enhanced performance compared to fixed equalization. For example, margins for noise (including crosstalk) and jitter may be better for adaptive transmit equalization than those of fixed equalization. Adaptive transmit equalization may permit a broader range of cable lengths and supported tolerances. In addition, adaptive transmit equalization may provide a simplified receiver design as compared to a system with a fixed transmitter equalizer and any form of adaptive receiver equalizer, e.g., equalization in the digital domain after analog to digital conversion, thereby resulting in reduced power consumption. In addition, adaptive transmit equalization may save power in the transmitter by using power back-off, e.g., for short channels. As part of the equalization, the signal power at the receiver is implicitly known and the signal power at the receiver can be used to request the transmitter to reduce its power.

Embodiments of the present invention may be provided, for example, as a computer program product which may include one or more machine-readable media having stored thereon machine-executable instructions that, when executed by one or more machines such as a computer, network of computers, or other electronic devices, may result in the one or more machines carrying out operations in accordance with embodiments of the present invention. A machine-readable medium may include, but is not limited to, floppy diskettes, optical disks, CD-ROMs (Compact Disc-Read Only Memories), and magneto-optical disks, ROMs (Read Only Memories), RAMs (Random Access Memories), EPROMs (Erasable Programmable Read Only Memories), EEPROMs (Electrically Erasable Programmable Read Only Memories), magnetic or optical cards, flash memory, or other type of media/machine-readable medium suitable for storing machine-executable instructions.

The drawings and the forgoing description gave examples of the present invention. Although depicted as a number of disparate functional items, those skilled in the art will appreciate that one or more of such elements may well be combined into single functional elements. Alternatively, certain elements may be split into multiple functional elements. Elements from one embodiment may be added to another embodiment. For example, orders of processes described herein may be changed and are not limited to the manner described herein. Moreover, the actions of any flow diagram need not be implemented in the order shown; nor do all of the acts necessarily need to be performed. Also, those acts that are not dependent on other acts may be performed in parallel with the other acts. The scope of the present invention, however, is by no means limited by these specific examples. Numerous variations, whether explicitly given in the specification or not, such as differences in structure, dimension, and use of material, are possible. The scope of the invention is at least as broad as given by the following claims.

What is claimed is:

1. A method comprising:
receiving a first signal from a first lane;
determining first equalizer settings of a first transmitter of the first signal based in part on error properties of the first signal using clock and data recovery for the first signal and also based in part on control signals from the first transmitter determined using a first control channel decoder, wherein the first equalizer used by the first transmitter is in compliance with one or more of clauses 72.7.1.10 and 72.7.1.11 of IEEE Std 802.3ap-2007;
requesting adjustment of the first equalizer settings using a control channel in compliance with a 10GBASE-KR PMD control function defined in clause 72.6.10 of IEEE Std 802.3ap-2007;
receiving a second signal from a second lane;
determining second equalizer settings of a second transmitter of the second signal based in part on error properties of the second signal using clock and data recovery for the second signal and also based in part on control signals from the second transmitter determined using a second control channel decoder;
transmitting the first equalizer settings to a receiver associated with the first transmitter;
transmitting the second equalizer settings to a receiver associated with the second transmitter;
requesting to adjust settings applied by the first equalizer of the first transmitter;
requesting to adjust settings applied by the second equalizer of the second transmitter; and
forming a third signal by combining contents of the received first and second signals, wherein
the first equalizer settings are determined independently from the second equalizer settings;
the first transmitter transmits independently of the second transmitter;
an aggregate transmission rate of signals transmitted over the multiple lanes is approximately a number of lanes times a transmission rate specified in 10GBASE-KR of IEEE 802.3ap (2007) and
electrical characteristics of the first and second transmitters are in compliance with clause 72.7.1 of IEEE Std 802.3ap-2007.

2. The method of claim 1, wherein the receiving the first and second signals comprise receiving the first and second signals in compliance with electrical characteristics of clause 72.7.1 of IEEE Std 802.3ap-2007.

3. The method of claim 1, wherein the receiving the first and second signals comprise:
receiving the first and second signals over a conductive material, wherein the conductive material includes two differential pairs.

4. The method of claim 1, further comprising:
receiving an indication of whether the first equalizer settings were applied.

5. The method of claim 1, wherein transmitting equalizer settings of the first transmitter takes place after determination of a number of utilized transmit-receive pairs.

6. The method of claim 1, wherein each of the first and second lanes comprises a coaxial cable.

7. A system comprising: a first transmitter comprising an equalizer, wherein the equalizer is in compliance with one or more of clauses 72.7.1.10 and 72.7.1.11 of IEEE Std 802.3ap-2007; a second transmitter comprising an equalizer, wherein the equalizer is in compliance with one or more of clauses 72.7.1.10 and 72.7.1.11 of IEEE Std 802.3ap- 2007, wherein electrical characteristics of the first and second transmitters are in compliance with clause 72.7.1 of IEEE Std 802.3ap-2007;
a first receiver;
a second receiver;
logic to form a third signal by combining content from the first and second signals; and
at least two sets of differential conductors to communicatively couple the first transmitter to the first receiver and to communicatively couple the second transmitter to the second receiver, wherein each of the at least two sets of conductors are to provide signal transmission in accordance with 10GBASE-KR of IEEE Std 802.3ap-2007, wherein
the first receiver comprises:
logic to receive a first signal from the first transmitter;
clock and data recovery logic to determine error properties of the first signal,
control channel decoder to decode control signals from the first transmitter,
remote transmit adaptation engine to determine first equalizer settings of the equalizer of the first transmitter based in part on the error properties and the control signals, and
a transmit control logic to request to adjust the settings applied by the equalizer of the first transmitter, the transmit control logic comprising:
logic to request to adjust equalizer settings of the first transmitter using a first control channel in compliance with 10GBASE-KR PMD control function defined in clause 72.6.10 of IEEE Std 802.3ap-2007; and
the second receiver comprises:
logic to receive a second signal from the second transmitter;
logic to determine second equalizer settings of the second transmitter based in part on clock and data recovery of the second signal;
logic to request to adjust equalizer settings of the second transmitter using a second control channel in compliance with 10GBASE-KR PMD control function defined in clause 72.6.10 of IEEE Std 802.3ap-2007; and
an aggregate transmission rate of signals transmitted between transmitter-receiver pairs is approximately a number of transmitter-receiver pairs times a transmission rate specified in 10GBASE-KR of IEEE 802.3ap (2007).

8. The system of claim 7, wherein the second transmitter further comprises:
logic to transmit the first equalizer settings to the second receiver to request to adjust equalizer settings of the first transmitter.

9. The system of claim 8, wherein the first receiver comprises:
logic to receive an indication of whether the transmitted first equalizer settings were applied by the first transmitter.

10. The system of claim 7, wherein the equalizer of the first transmitter comprises a feed forward equalizer and wherein the first transmitter comprises:
a control channel encoder to encode control signals for transmission to the first receiver.

11. The system of claim 7, wherein the equalizer of the first transmitter comprises a finite impulse response filter.

12. The system of claim 7, wherein the equalizer of the first transmitter comprises a feed forward equalizer.

13. The system of claim 7, wherein the second transmitter includes a Continuous-Time Linear Equalizer (CTLE), finite impulse response filter, and digital infinite impulse response filter, and wherein the first transmitter is to request an equalizer used in the second transmitter.

14. The system of claim 7, wherein the remote transmit adaptation engine is to determine equalizer settings after determination of a number of utilized transmit-receive pairs.

15. The system of claim 7, wherein each of the first and second lanes comprises a coaxial cable.

* * * * *